United States Patent [19]

Haberl et al.

[11] 4,264,208

[45] Apr. 28, 1981

[54] METHOD AND APPARATUS FOR MEASURING THE SURFACE OF AN OBJECT

[75] Inventors: Rainer Haberl, Traiskirchen; Kurt Mravlag, Vienna, both of Austria

[73] Assignee: Semperit Aktiengesellschaft, Traiskirchen, Austria

[21] Appl. No.: 10,743

[22] Filed: Feb. 9, 1979

[30] Foreign Application Priority Data

Aug. 29, 1977 [CH] Switzerland .................. 10,492/77

Related U.S. Application Data

[63] Continuation-in-part of Ser. No. 937,777, Oct. 25, 1978.

[51] Int. Cl.³ ............................ G01B 11/24; G01J 1/20
[52] U.S. Cl. ....................................... 356/376; 250/201
[58] Field of Search ........................ 356/371, 375–376, 356/4; 250/201

[56] References Cited
U.S. PATENT DOCUMENTS

| | | | |
|---|---|---|---|
| 3,385,159 | 5/1968 | Bliss et al. | 356/4 |
| 3,606,541 | 9/1971 | Sugano et al. | 356/371 |
| 3,721,486 | 3/1973 | Bramley | 350/6.1 |
| 3,980,890 | 9/1976 | Heckrodt et al. | 250/223 B |
| 4,062,633 | 12/1977 | Stapleton et al. | 356/385 |
| 4,074,938 | 2/1978 | Taylor | 356/386 |
| 4,088,408 | 5/1978 | Burcher et al. | 356/376 |

OTHER PUBLICATIONS

Rosenberger, D., "Technische Anwendungen Des Lasers," Springer Verlag, pp. 59–61.

*Primary Examiner*—John K. Corbin
*Assistant Examiner*—Wm. H. Punter
*Attorney, Agent, or Firm*—Ernest F. Marmorek

[57] ABSTRACT

An optical system focuses a laser beam emanating from a laser onto a surface of an object, such as a circumferential surface of the object to be measured. The light beam is reflected from the object, so as to form a generally focused light spot; the intensity of the light spot, which depends on the distance of the surface from the optical system, is measured, and the measurement results are displayed and/or utilized for controlling the dimensions of the object, if the object is an elongated article, and is continuously produced, generally in a direction transverse to its cross-section.

22 Claims, 12 Drawing Figures

METHOD AND APPARATUS FOR MEASURING THE SURFACE OF AN OBJECT

CROSS-REFERENCES TO RELATED APPLICATIONS

This application is a continuation-in-part application of Application Ser. No. 937,777, filed on Oct. 25, 1978, by the inventors of the present application.

BACKGROUND OF THE INVENTION

The present invention relates to a method of, and an arrangement for measuring the contour of a cross-section of an object, such as an elongated article in general, and more particularly of an article produced by an extrusion.

The present invention is concerned with the measurement of the cross-sectional contour of an elongated article or object which is either stationary, or is advanced in its longitudinal direction, the article having an arbitrary length, wherein one or more laser beams scan the surface of, and are focused onto the surface of the elongated article, the rays reflected from the surface being formed into a light spot. Any changes in the image of the light spot, which occur as a result of any deviation of the surface from an ideal surface during the scanning process, are measured, registered and, if required, displayed after having been converted into corresponding analog and/or digital signals.

There is already known an arrangement which is capable of focusing a laser beam on the surface of an object, by utilizing an optical system, which also registers the variations in the intensity of the image of the light spot by means of a photo-detector, when changes take place in the distance between the laser and the surface of the object. Background information, with respect to known systems, is available in "Laser in Industrie und Technik" (Laser in Industry and Technology) Publisher Lexicon, "Technische Anwendung des Lasers" (Technical Application of the Laser) Publisher Springer, particularly pages 59 to 61, and Naray, "Laser und Ihre Anwendungen" (Lasers and their Applications), Publisher Akademische Verlagsgesellschaft.

The previously mentioned conventional arrangement operates in such a manner that the laser beam emanating from the laser is collimated by a collimating lens system, and the parallel light beam is then focused onto the surface of the object. A ray-dividing mirror is arranged in the path of the laser beam at the collector lens system, and is disposed at an angle of 45° with the optical axis of the system. This mirror is permeable to the light impinging thereon from the direction of the collecting lens system, but is impermeable to any light arriving from the opposite direction. Accordingly, the light rays, which are reflected from the surface of the object, are reflected from the rear side of the ray-dividing mirror, and then proceed towards another mirror, which further reflects the light rays onto a collecting lens. From there, the light rays pass towards a photo-detector. A perforated diaphragm is arranged between the photo-detector and the collecting lens, the focal point of which is arranged upstream or frontwardly of the photo-detector. Advantageously, the perforated diaphragm is arranged approximately at the focal point of the lens. This perforated diaphragm is connected to an oscillator, which drives it, and thus oscillates at a certain frequency along the axial direction of the optical system. As a result of this oscillation of the perforated diaphragm, a fluctuating quantity of light reaches the photo-detector, depending on how far the perforated diaphragm is spaced from the focal point, or image.

When the perforated diaphragm moves through the focal image, then the photo-detector will indicate a maximum of light intensity at the moment of passage of the perforated diaphragm through the focal image. Now, considering the case where the distance between the surface of the object, upon which the laser beam impinges, and the laser remains constant, the variations of intensity indicated by the photo-detector of the image of the laser light spot, which are the result of the oscillation of the perforated diaphragm, will then fluctuate between two constant values. If it is assumed that the oscillation center of the perforated diaphragm is located exactly at the focal point of the collector lens, then the intensity variation indicated by the photo-detector will be a symmetrical Gaussian curve, the maximum of which corresponds to the position of the perforated diaphragm at the focal point.

When the difference between the measurement of the photo-detector in two successive positions of the perforated diaphragm, corresponding to successive maxima of light intensity, respectively, is utilized for evaluation of the measured distance, then a zero difference between these values is obtained if the distance from the focused light spot on the surface of the object to the focal image of the light spot remains the same. In every other case, that is, when the center of oscillation of the perforated diaphragm is not located at the focal image, compared to its previous position in the oscillation cycle, there is obtained either a positive or a negative value in the difference indication of the photo-detector, compared to the previous two successive positions of the perforated diaphragm.

Now, should the distance of the surface of the object from the laser vary during the scanning motion of the laser beam, then the intensity of the focused light spot on the surface of the object will also change accordingly. As a result, the intensity of the light spot obtained from the object-reflected beam, and its intensity as a function of time, as registered by the photo-detector, will also vary in the course of the oscillation of the perforated diaphragm. The intensity differences at the output of the photo-detector, which corresponds to intensity differences in the axial positions of the perforated diaphragm in the light axis of the system, are registered by the photo-detector as a potential difference.

Now, assuming that an object is moved with respect to the laser beam or, conversely, that a laser beam is moved with respect to a stationary object, then a change in the structure of the exposed surface of the object can be determined in one dimension by means of a known arrangement, provided that the surface of the object is properly positioned and adjusted; furthermore, this change may, if required, be registered and displayed. This known arrangement is not suited for a two- or three-dimensional determination of the exposed surface of a body, which is to be surveyed. This problem is encountered, for instance, when rubber or synthetic plastic materials are being extruded, and it is desired to determine their 3-dimensional shapes. Despite all technical advances, it is often not possible to maintain the cross-sectional dimensions of an extruded article with the needed precision. This problem is encountered especially in connection with articles of rubber, inasmuch as the composition of the rubber material can never be obtained in a precisely uniform manner under all circumstances; thus, a differential swelling can occur following extrusion, as a result of which the vulcanized article may exceed the range of any predetermined tolerances required of its cross-section. This undesired situation cannot be corrected in a satisfactory manner, by resorting to any currently known techniques.

It would be theoretically possible to resort, for instance, to mechanical scanning methods, which, however, have other disadvantages, as they require a certain measuring pressure to be exerted on the object which, in turn, results in a deformation of objects, especially made of rubber, and thus yield an erroneous indication. A further, at least theoretical alternative, is the utilization of an isotope-measuring method, in which the thickness of the article being extruded is determined by adsorption measurement of radioactive rays. In addition to the general disadvantages due to radioactive measurements, a specific disadvantage of such radioactive measurements is the fact that such a measuring method does not actually measure the cross-section of the object investigated, but only its surface density. A further disadvantage of the measuring method of this type is due to the fact that the sensitivity range of the measuring apparatus must be very accurately matched with the range to be measured, so that when more substantial thickness differences occur in the article being measured, it is no longer sufficient to use only a single measuring sensor.

A relatively primitive method of determining surface irregularities is the determination of the weight of a corresponding section of the elongated article. It is self-evident that this procedure will yield only very imprecise data.

SUMMARY OF THE INVENTION

Accordingly, it is a general object to avoid the disadvantages of the prior art.

More particularly, it is an object of the present invention to devise a method of measuring or surveying the surface of an elongated article, which does not have the disadvantages of the prior art methods.

It is further an object of the present invention to provide a measuring method, which can be performed with relative ease and at a relatively low expense, but which gives excellent measuring results.

A still further object of the present invention is to develop a method of manufacturing elongated articles, in which the cross-sectional dimensions of the article being manufactured are kept within a narrow tolerance limit.

A concomittant object of the present invention is to design an apparatus which is capable of accomplishing the above objects in a simple and inexpensive way, but with a high degree of accuracy.

These objects and others, which will become apparent hereafter, are achieved when, in accordance with one aspect of the present invention, in a method of measuring and recording the topography of a surface of an article, the steps include impinging at least one laser beam at an angle onto at least a portion of the surface to form an illuminated spot thereon, the characteristics of the laser rays reflected from the illuminated spot varying in dependence of the topography of the surface, scanning that part of the surface with the laser beam, measuring the characteristics as a function of the scan by the laser beam, transforming the measured characteristics into electrical signals, and recording the electrical signals.

It is advantageous if the impinging step includes focusing the laser beam onto the surface.

In a preferred embodiment, the article is elongated, has a longitudinal axis, and an additional step includes moving the article along the longitudinal axis, the laser beam subtending a predetermined angle with the longitudinal axis.

It is advantageous if the scanner step is performed within a frequency range of approximately 1 to 10 Hertz.

The method may include additional impinging, measuring, and scanning steps relating to another part of the surface, and synchronizing all of the impinging, measuring and scanning steps with one another.

It is preferable if all of the impinging steps are performed so as to scan at least mutually adjacent regions of the surface being measured, and if the synchronizing step includes converting the electrical signals into a single signal representative of the entire topography of the surface; the method preferably includes the step of visually displaying the single signal, or displaying the results of the measuring step in visual form.

In the aforesaid method, the laser beam has a point of origin, a measurable distance being defined between the point or origin and the surface, the measuring step including reflecting the laser beam from the surface, focusing the reflected laser beam so as to obtain a focal image of the illuminated spot, the image having a substantially predetermined diameter and defining with the illuminated spot an optical axis, defocused spot regions existing on opposite sides of the focal image along the optical axis, periodically measuring the light intensity within the predetermined diameter along the defocused spot regions and the focal image, the light intensity reaching a peak when the predetermined diameter coincides with the focal image, and measuring the time occurrence of each peak, the distance from the origin of the laser beam to the surface being determinable as a function of the time occurrence of each peak.

An alternate version of the present invention includes the step of continuously rotating the laser beam around the article.

The method of manufacturing an elongated article, includes the steps of continuously shaping the article, advancing the article past a measuring location, directing at least one laser beam at the measuring location onto an external surface of the article to form at least one illuminated spot on the external surface, scanning the external surface by the laser beam at an angle to the advancement direction of the article, the characteristics of the laser rays reflected from the illuminated spot varying in dependence on the topography of the external surface of the article, measuring the characteristics as a function of the scan of the laser beam, and feeding back the results of the measuring step to the shaping step, so as to control the shaping step in dependence on the feed-back results.

The laser-optical system for measuring the surface of an article advantageously includes means for directing at least one laser beam onto the surface to be measured, to form an illuminated spot thereon, the laser rays reflected from the illuminated spot varying in dependence on the topography of the surface, means for scanning the laser beam across the surface, so as to impinge on the surface at a predetermined angle, and means for measuring the characteristics of the laser rays reflected from the illuminated spot, so that a contour of the cross-section of the article can be obtained from the characteristics.

It is advantageous if the means for directing the laser beam onto the surface includes a laser from which the laser beam exits in one direction for travel in a predetermined path, and if a collimating lens and a collecting lens are arranged in series in the path; and further if the means for measuring the characteristics includes a one-way mirror extending across, and at an acute angle to the path, which mirror is permeable to the laser beam traveling in one direction, but is impermeable to, and reflects any light rays traveling in the path opposite to the one direction into an additional path, and further if a light sensor is arranged in the additional path.

The means for measuring the characteristics preferably include an additional collecting lens arranged in the additional path between the one-way mirror and the light sensor.

The laser beam will have a point of origin, so that a plurality of measurable distances can be defined between the point of origin, and distances can be defined between the point of origin and the surface to be measured, and it is further advantageous to provide a light stop, and moving means for periodically moving the light stop between two extreme positions in the additional path, the illuminated light spot being substantially fosucable onto the light stop at a plurality of determinable distances from one of the extreme positions, so as to define peaks of light intensity occurring at measurable time intervals from respective predetermined time slots; each measurable time interval further corresponds to a respective measurable distance, so that the measurable distances, and consequently, a contour of the cross-section of the article may be obtained from the plurality of measuring time intervals.

It is advantageous if smoothing means are connected to the moving means for providing a substantially continuous signal corresponding to the determinable distances.

The moving means preferably include an oscillator, and the smoothing means advantageously include a lock-in detector which has two inputs, and an output, one of the inputs being connected to the light sensor, the other to the oscillator, while the output provides the substantially continuous signal.

It is further advantageous if signal evaluating means are provided, which include a measurement-result decoder connected to the smoothing means, an electronic data processor connected to the decoder, and if parameter-feeding- and indicating-means are connected to the data processor.

The means for directing one laser beam onto the surface, the means for measuring the characteristics, and the means for scanning the laser beam across the surface, together form a laser-optical unit; it is further advantageous to provide a ring-shaped support member, and to mount the laser-optical unit on the support member for being circumferentially adjusted thereon.

It is advantageous to provide at least one additional laser-optical unit, similar to the laser-optical unit, which is also mounted on the support member, and circumferentially adjustable thereon.

In one version of the invention, the means for scanning the laser beam across the surface include a refraction grating which has a controllable index of refraction.

The particular advantages of the above-discussed method and apparatus will now be further discussed with particular emphasis on its application.

A laser beam or a plurality of laser beams, as has been described, is (or are) thus moved periodically between two extreme positions in a plane which extends perpendicularly to the direction of motion of the elongated article, when, for example, it is continuously being extruded. By this means, there is obtained a contactless measuring method for measuring or surveying at least a surface of a stationary or preferably moving elongated article; the measurement does not take place merely along a straight line, but rather successive measurements are taken along any arbitrary exposed surface, so that a complete three-dimensional image of the surface of the elongated article can be obtained by resorting to the use of an appropriate evaluating arrangement. More particularly, as a result of this periodical motion of the laser beam between two extreme positions, also referred to as a scanning motion, there can be obtained, within a fraction of a second, an instantaneous picture of the entire width or circumference of the elongated article scanned by the laser beam, provided the speed of translation of the elongated article is appropriately coordinated with the scanning of the laser beam. Consequently, an analog and/or digital display arrangement can directly indicate any curved configuration of the surface measured, for instance on a television screen by means of the aforesaid scanning procedures between two extreme positions. Thus, a curved configuration of the surface of an elongated article by means of the aforesaid scanning procedure can be registered during a continous advancement of the elongated article along its longitudinal axis at minimal consecutive discrete longitudinal spacings, so that, in the final analysis, an endlessly long surface, made up of closely neighboring discrete curved sections, can be surveyed and measured.

By providing a scanning movement, which has a frequency of approximately between 1 and 10 cycles per second, not only slow, but even very quick longitudinal movements of the elongated section can be still registered. The highest advancement speed of the elongated article, which can still be handled by this measuring method, is approximately 10 meters per second at a frequency of the scanning motion of 10 cycles per second, when the average measuring interval in the movement direction between successive scans is required to be approximately 0.5 millimeters. Of course, when the measuring interval is permitted to exceed 0.5 mm, then the advancement speed can be correspondingly increased.

In the event that the elongated article is so dimensioned that the surface to be registered cannot be scanned by a single laser beam, a plurality of laser beams can be focused on the surface of the elongated article in a plane normal to the longitudinal direction of advancement of the elongated article. Then, the registry and, if necessary, display of the respective surveying effects of the individual laser beams must, of course, be accomplished in a time-synchronized manner. Only under these circumstances do the measuring results obtained correspond to a common curved configuration along the cross-section of the elongated article.

It is advantageous if the measuring effects, which are obtained during the movement of the laser beam normal to the longitudinal direction of advancement of the elongated article, are displayed in a spatially coordinated manner in the form of an analog or digital signal, which is spatially or geometrically similar to the actual configuration of the measured surface. Then, it is possible to display the registered and measured values also optically, for instance, on a television screen, so that supervision and control of the surface of the elongated article can be obtained even in this manner. It is then advantageous to juxtapose the curve of the desired configuration on the television screen over the curve of the actual configuration, so that any impermissible tolerance deviations can be immediately established.

It is desirable in many instances to measure the entire circumferential surface of the elongated article. It is further advantageous to arrange a plurality of laser beams about the elongated article, so that the laser beams scan at least immediately neighboring regions of the elongated article during the scanning motion. Under these circumstances, the time-wise synchronous analog and/or digital signals are optimally displayed in the form of a closed line, which is geometrically similar to the circumference of the elongated article, which is being scanned by the laser beams. Thus, a closed line of the article is being scanned during a synchronous motion of the laser beam used. Then, during the advancement of the elongated object in its longitudinal direction, one closed line sequentially follows the next closed line in time, so that, in a pictorial representation, sequential closed lines arranged in a succession represent the elongated article being measured as a succession of discrete "discs". This display can be continued in an endless manner, so that, for instance, when a profiled section which is being extruded from an extruding device is to be recorded, the entire production length can be measured, and evaluated in a single operating step. It is important in connection with the method of the present invention, that the elongated article measured be freely movable in space, and not subjected to any external forces which would cause any deformation. It is also important that the measuring speed be selected at a sufficiently high value that it can be fully matched, if necessary, to the predetermined speed of advancement of the elongated article, whose dimensions are to be measured.

The present invention can also be utilized for controlling the manufacture of the elongated article. When this is the case, it is advantageous if analog and/or digital signals are used as reference values for the purpose of control and/or regulation of the manufacturing process. In this manner, it is possible to immediately discover any deviations or errors during the manufacture of the elongated article, and also to immediately take any necessary correcting steps for avoiding such errors or deviations. In this manner, when the dimensional accuracy of the elongated object is measured immediately downstream from the equipment which continuously manufactures the elongated object, the amount of any erroneously manufactured profiled section can be reduced to a minimum. This, in addition to the economic advantages, also increases the output of the manufacturing machine, and enhances the quality of the product.

Where the laser-optical system used for the performance of the above-discussed method includes a collecting lens, a collimating lens, a ray dividing mirror, and another collecting lens, which items are sequentially arranged in the path of the laser beam of a laser, and where the ray dividing mirror is inclined with respect to the optical axis of the system and is light-permeable to the beam emanating from the laser, but opaque to any rays which arrive from the opposite direction, and an arrangement for periodic oscillation of the laser beam is additionally arranged in the path of the laser beam, mechanical independence from the other parts of the laser-optical system is obtained solely by the oscillatory movement of the laser beam, so that the arrangement for moving the laser beam can be operated fully independently.

A mechanically tiltable optical arrangement can be used in the case of relatively low frequencies of the movement of the laser beam; however, it is advantageous, especially at higher frequencies, when the mechanism for moving the laser beam consists of a controllable refraction grating. Refraction gratings of this type are made of optically transparent materials, the coefficient or refraction of which can be periodically changed by application of an altnerating current. The coefficient of refraction of the refractory grating changes synchronously with the frequency of the alternating current, which may even be a relatively high frequency, so that the laser beam or any individual laser rays are correspondingly deviated. Thus, the light spot which is produced by the laser beam travels within the desired limitations on the exposed surface of the elongated article to be measured. An especially advantageous arrangement of the laser-optical system, according to the present invention, includes a ring-shaped housing, in which at least two laser-optical systems are mounted for movement along an inner jacket surface of the ring in a circumferential direction; the motion of the systems may be halted in any of the desired positions. In correspondence with the complexity of a contour of a cross-section of the elongated article which is to be measured, there can be also used more than two laser-optical systems, all being arranged in the annular housing, so as to be able to measure, for instance, undercuts or the like. The movable mounting of the laser-optical systems in the housing permits these to be mounted to the contour of the cross-section of the elongated object to be measured.

When a collecting lens, a perforated diaphragm coupled to an oscillator, and a photo-detector are arranged in succession in the path of the laser beam reflected via the ray-dividing mirror from the object, following the ray-dividing mirror, it is further advantageous when the measured current, which is produced in the photo-detector, is supplied via an amplifier to an input of a lock-in detector.

A fully automatic measuring, registering and controlling station is achieved by this arrangement which may be utilized, if required, via corresponding pulse converters, for controlling of regulating arrangements of the manufacturing machine. The details of construction and operation will now become apparent from the accompanying drawings.

DETAILED DESCRIPTION OF THE PREFERRED EMBODIMENTS

Figures 1, 12:
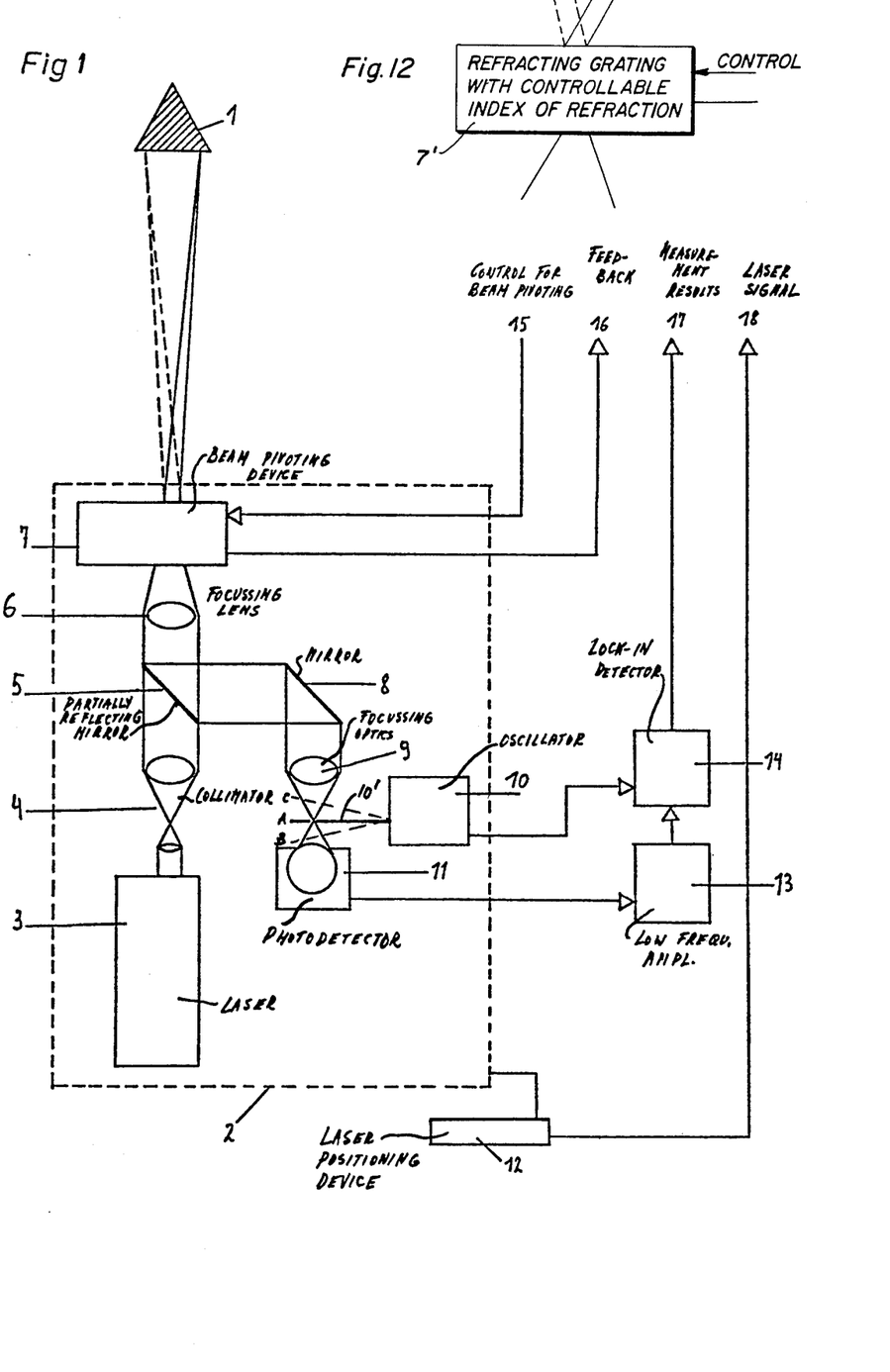
FIG. 1 is a diagrammatical view showing the laser-optical system.
FIG. 12 is an alternate implementation of the beam shifting device shown in FIG. 1.

Referring now to the drawings in detail, and first to FIG. 1, it may be seen that the reference numeral 2 has been used to designate a laser-optical unit in toto. The laser-optical unit 2 includes a laser 3, from which a laser beam emanates for travel in a predetermined path. During its travel, the laser beam passes through a collimator lens 4, penetrates through a separating or "one-way" mirror 5, which is arranged at an angle of 45° to the optical axis, and is permeable to the laser beam passing in the direction from the laser 3 to a focusing lens 6, but is substantially impermeable to a light beam passing in the direction from the focusing lens 6 to the mirror 5 and reflecting away therefrom. Following passage through the "permeable" portion of the mirror 5, the laser beam then focused by the collecting lens 6 onto the surface of an object or article 1, which may be moving continuously along a longitudinal axis thereof. The laser beam impinges preferably at an angle with the longitudinal axis of the article 1, and forms an illuminated spot on its surface. Between the lens 6 and the object 1, the laser beam passes through a beam-moving shifting device 7, which may be either a beam pivoting device 7, or a reflecting grating 7' with a controllable index of refraction, controlled by a control input. The laser beam which has thus scanned at least part of the circumferential surface of the article or object 1, is then reflected from the object 1 and is further reflected from the rear side of the separating mirror 5, toward and onto a ray diverting mirror 8, and then passes through another collecting lens 9 to a photo-detector 11 the characteristics of the laser rays reflected from the illuminated spot vary in dependence of the topography of the surface. It will be understood that the laser beam has a point of origin at the laser 3, and that measurable and reference distances are defined between the point of origin and the circumferential surface of the article 1. A moving means, such as an oscillator 10 is arranged between the lens 9 and the photodetector 11. The oscillator 10 includes a perforated diaphragm or light stop 10', which is normally positioned approximately at the focal point of the collecting lens 9. The diameter of the perforation of the perforated diaphragm 10' amounts to several tenths of a millimeter. The oscillator 10 actuates the diaphragm 10'.

It will be seen from FIG. 1 that the perforated diaphragm 10' will oscillate between a center position denoted by A, and extreme positions denoted by B and C. The relation of the position of the perforated diaphragm 10' to the intensity registered by the photodetector 11 is shown in FIGS. 2 and 3, respectively.

Figure 2:
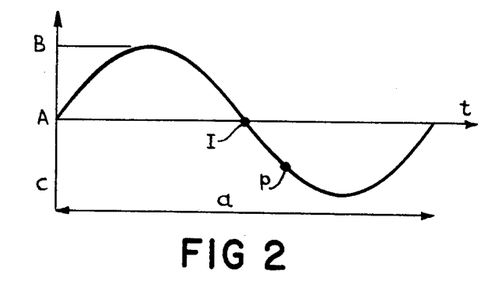
FIG. 2 is a graph that shows the displacement of the oscillating diaphragm as a function of time, including the location of the focal points.
Figure 3:
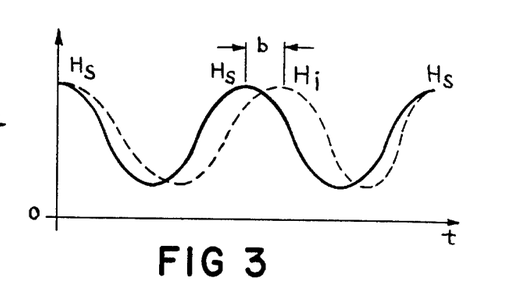
FIG. 3 is a graph that shows the fluctuation of the light intensity which is to be determined, in dependence of the surface geometry of the article, the cross-section of which is to be determined.

In FIG. 2, the intersection of the sinusoidal curve with the abscissa, aligned with the point A, denotes the center position in time of the perforated diaphragm 10', when the surface of the object 1, as scanned by the beam pivoting device 7, is also disposed at a predetermined distance from the focusing lens 6, so as to yield an ideal focusing point I, located on the aforementioned abscissa, resulting in turn, at the same moment of time, in the point of maximum light intensity $H_i$ in FIG. 3, at which point the surface of the object I does not deviate from the aforesaid predetermined distance; the regions above and below the abscissa A in FIG. 2, on one hand, and below the points of maximum light intensity $H_s$ and $M_i$ in FIG. 3, on the other hand, are defocused regions existing in fact on opposite sides of the focusing point or focal image and defining therewith an optical axis. As the light beam is, so to speak "spread out" in the defocused regions, compared to being "concentrated" in the focal image, the light intensity will register a "high" at the focal image, and "lows" at the defocused regions.

As soon as the surface on the object I, during the scanning of the pivoting device 7, deviates from the aforesaid predetermined distance, so as to yield, for example, a focal image or point P in FIG. 2, the position of the maximum light intensity in FIG. 3 is phase-shifted from the point $H_i$ to the point $H_s$. This change is measurable by measuring the distance "b" from the point $H_s$ to the point $H_i$, which is a direct measure of the deviation of the surface of the object I from the predetermined distance, namely, the distance it is desired to measure, as viewed in the direction from the object I to the pivoting device 7, in FIG. 7. The time period "a" in FIG. 2 therefore corresponds to one complete cycle of oscillation of the perforated diaphragm 10', and to the time between three maxima $H_s$ (in the case of the aforesaid exact predetermined distance of the object I from the focusing lens 6). It is interesting to note in this respect that the distance "b" defining the time occurrence of the peaks, $H_s$ from the predetermined time slots $H_i$ is substantially independent of the light intensity of the rays reflected from the surface of the object I, as the distance "b" determines the measurable time interval between the peaks of light intensities $H_i$ and $H_s$, so that the light intensity of $H_i$ may be lower (or higher) than the light intensity $H_s$. It will be convenient to denote $H_i$ as the peak corresponding to the reference distance, and all peaks $H_s$ corresponding to measurable distances, as measured peaks, respectively. By measuring the time deviation between the reference peak and a corresponding measured peak, the incremental distance change between the origin of the laser beam and the reference point on the surface of the object 1, on one hand, and a point on the surface of the object 1, whose distance from the origin of the laser beam is to be measured, can be obtained. The actual distance from the origin of the laser beam to the point to be measured is obtained by summing the so measured incremental distance with the reference distance. The frequency of the beam pivoting device 7 should be lower than that of the oscillating diaphragm 10' for optimum resolution, and should in no circumstances exceed ½ of the frequency of the oscillating diaphragm 10'.

The current which is generated by the photo-detector 11 shown in FIG. 1, based on the intensity difference of the reflected laser-beam, which reaches the photo-detector 11 in correspondence with the extreme positions of the perforated diaphragm 10', is fed through a low frequency amplifier 13 to a so-called lock-in detector 14, which is also connected to the oscillator 10.

The lock-in detector 14 operates in a manner similar to that of a V.C.O. (voltage-controlled oscillator) used in television sets. In a conventional V.C.O., the V.C.O. follows a reference frequency, which has been obtained from a signal source via a frequency-modulation detector, followed by an integrator, acting as a smoothing means, the signal source having usually been corrupted by noise, so that the V.C.O. follows only any long-term frequency variation of the signal source, the integrator filtering out any instantaneous frequency deviations due to noise, which frequency deviations appear in the frequency domain as sidebands of the desired carrier. Any long-term frequency deviation of the signal source could, if desired, be recovered in terms of a voltage variation, if another frequency modulation detector is post-coupled to the V.C.O.

In the present invention, the output of the lock-in detector is equivalent to the long-term frequency deviation discussed above, the time constant of the integrator being selected so that the variation "b" is continuously or smoothly indicated at the output terminal 17 of the lock-in detector.

The oscillating beam pivoting device 7 may be controlled by a (non-illustrated) oscillator oscillating at predetermined reference frequency; in this case, the line 15 represents the output of the (non-illustrated) oscillator drive, while the line 16 represents a feedback line to the (non-illustrated) oscillator controlling the frequency of the beam pivoting device 7 the alternate embodiment of a refracting grating with a controllable index of refraction, shown diagrammatically in FIG. 12, also referred to alternately as a "modulated grating" is discussed in standard modern reference textbooks on optics, for example, in "Optical Information Processing and Holography" by W. Thomas Cathey, John Wiley & Sons, on page 55.

A line 18 carries a laser head positioning signal, the line 18 being connected to a laser positioning drive 12, which controls the position of the laser measuring unit 2, and which will be described later in further detail with reference to FIG. 4.

Figure 4:
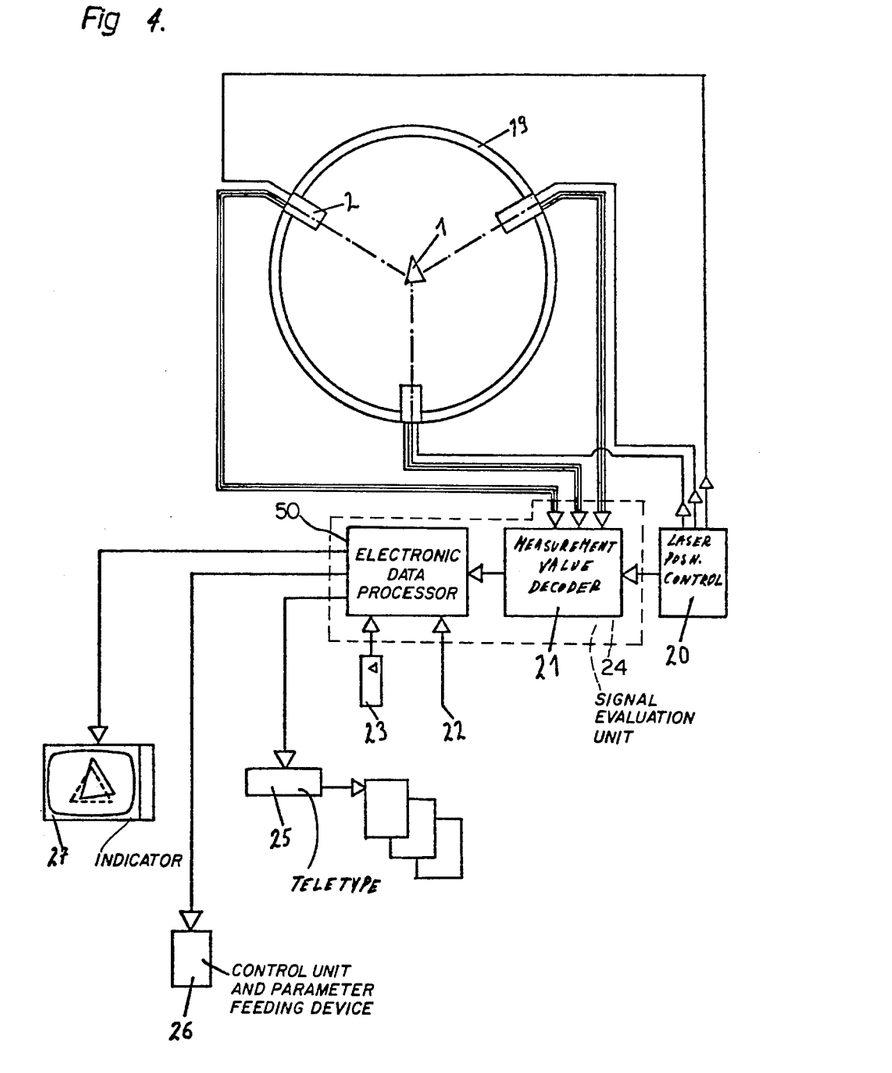
FIG. 4 is a block diagram of the invention.

In accordance with the block diagram illustrated in FIG. 4, three laser-measuring units 2 are arranged in a mounting frame 19. The laser beams emanating from these laser-measuring units 2 impinge on different portions of the surface of an elongated object 1, which as illustrated, has a triangular cross-section. Each laser-measuring unit 2 is positioned by operating a laser beam positioning control 20. The measured signals, which are derived from the laser-measuring units 2, are processed by signal evaluation unit 24, including a measured value-decoder 21, and then are supplied to an data processor 50. In order to render the data processing possible, the electronic data processor 50 is connected to an input for the desired or reference value 22, and to an input for the actual value 23. The data which are derived from the electronic data processor 50 can be transcribed in a numerical form by a teletype machine 25, on the one hand, or utilized for a pictorial display on an indicator such as a television screen 27, on the other hand. In order to render possible a direct feedback with the manufacturing process of the object 1, a connecting line from the electronic data processor 50 feeds corresponding control and parameter feeding devices 26 for control of the manufacturing process.

Figure 5:
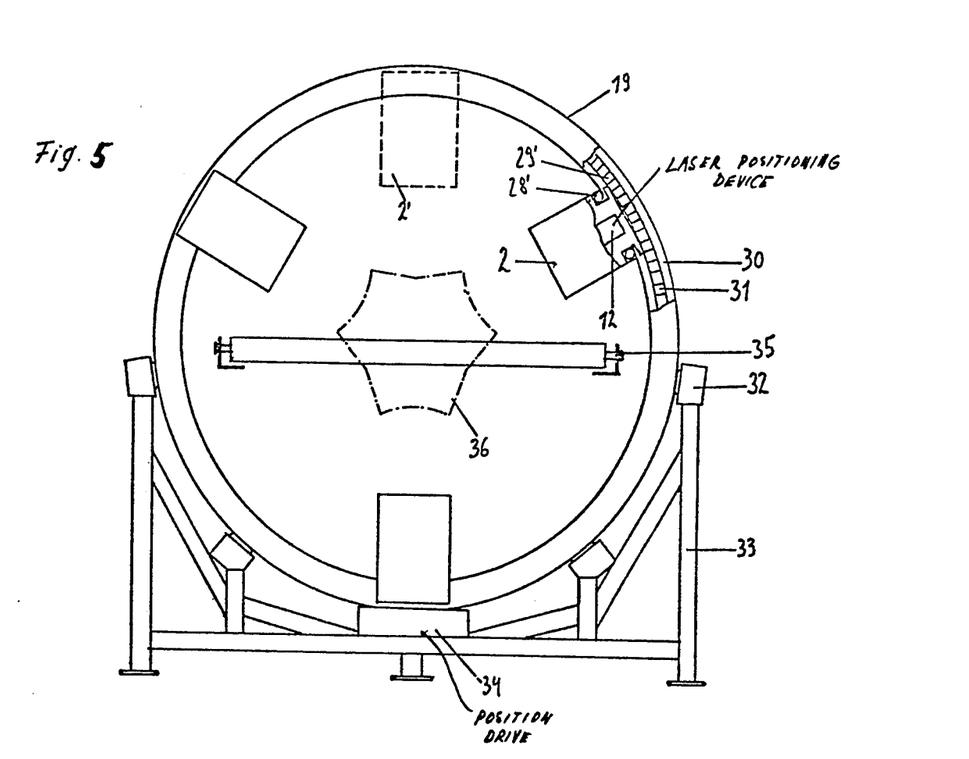
FIG. 5 is a front elevational view of the arrangement, including a plurality of lasers arranged thereon, though shown on a reduced scale compared thereto.
Figure 6:
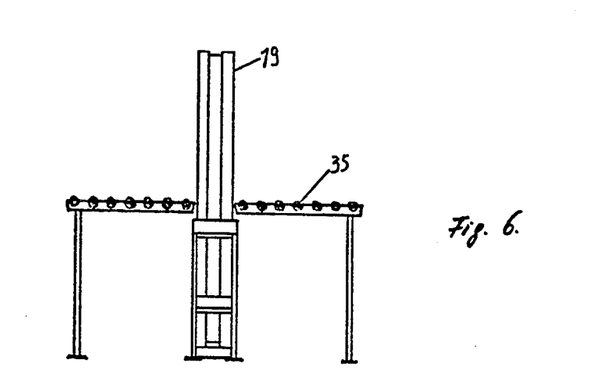
FIG. 6 is a schematic side elevational view corresponding to FIG. 5.

An arrangement of the laser measuring units 2 within a mounting frame 19 is illustrated in FIGS. 5 and 6. An inner guide 28' is provided at the base of the laser-measuring unit 2, to which an outer guide 29' on the mounting frame 19 corresponds. An outer guiding ring 30 corresponds, in turn, to the outer guide 29. The above-mentioned positioning drive 12 serves the purpose of adjusting the positions of the laser measuring units 2 within the mounting frame 19. The drive 12 can move, for example, the laser measuring unit 2, by means of a toothed portion 31. The laser measuring unit 2 can thus be displaced, for instance, to the position 2'. The position of the laser measuring units 2 with respect to the object 1 can alternately be changed by rotating the entire mounting frame 19 with respect to the object 1. A positioning drive 34 serves for this latter purpose. In order to render the rotation of the mounting frame 19 possible, the frame 19 is supported on guiding rollers 32 via braces 33. A roller conveyor 35 serves for guiding the profiled article 1, the surface of which is to be surveyed. An area 36, shown in dash-dotted lines in FIG. 3, at and around the center of the roller conveyor 35, symbolically indicates the measuring range which is available for surveying the surface of the article 1 in the illustrated example.

Figure 7:
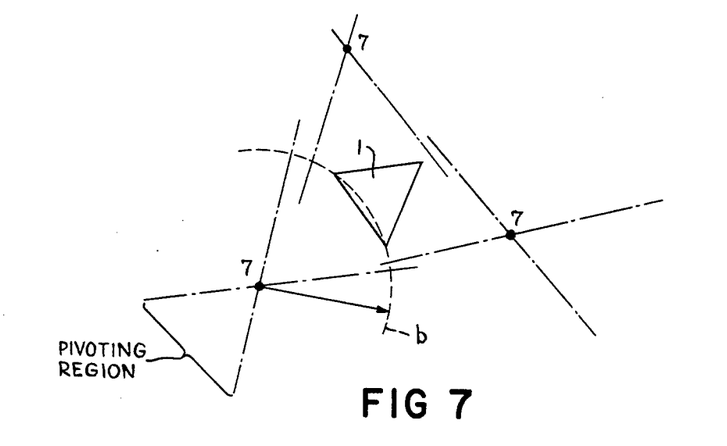
FIG. 7 is a diagram showing how a signal is obtained from each laser in polar coordinates.
Figure 8:
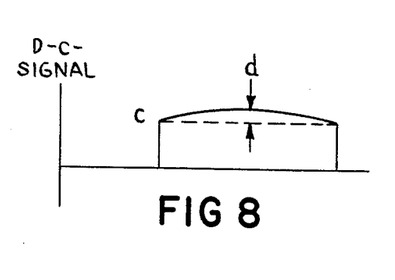
FIG. 8 shows a graph of a signal obtained from a single laser pivoting device of FIG. 7 in polar coordinates.
Figure 9:
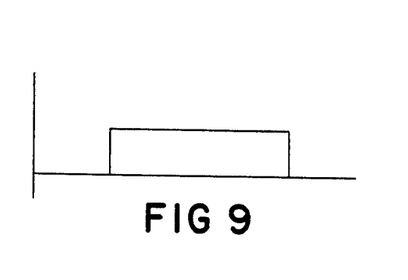
FIG. 9 is a graph that shows the transformation of the polar coordinate-signal shown in FIG. 8, to cartesian coordinates.

FIG. 7 shows schematically how a signal is obtained from each laser in polar coordinates; each laser beam pivoting device is schematically denoted by a dot bearing a reference numeral 7. The signal obtained from each laser beam pivoting device 7 in polar coordinates is shown in FIG. 8, the horizontal line "c", denoting the ideally desirable signal in cartesian coordinates, and the distance "d" the maximum deviation from the desired signal. Upon conversion from polar coordinates to cartesian coordinates, a signal as shown in FIG. 9 is obtained.

Figure 10:
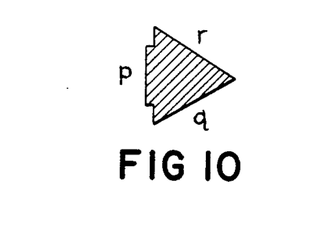
FIG. 10 is a sectional view of a typical object, having two similar sides, and a third dissimilar side.
Figure 11:
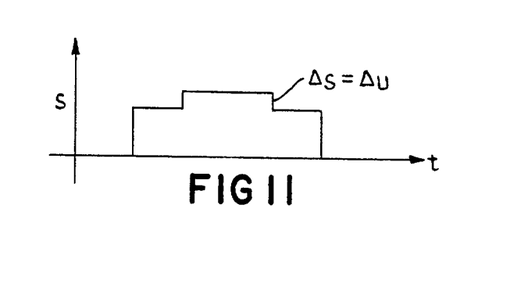
FIG. 11 is a graph that shows a signal in cartesian coordinates obtained from the dissimilar side of FIG. 10, by a single laser, or laser pivoting device

FIG. 10 shows the cross-section of a typical object having two similar sides "r" and "q", and one dissimilar side "p". FIG. 11 corresponds to FIG. 9, but depicts the dissimilar side "p" of FIG. 10, the differential distance $\Delta s$, denoting the elevation of a portion of the side "p" of FIG. 10 above the baseline being clearly shown.

Having thus described the invention, what we claim as new and desire to be secured by Letters Patent, is as follows:

1. In a method of measuring and recording the circumferential surface of an article moving continuously along a longitudinal axis thereof, the steps comprising:

impinging at least one laser beam at an angle with said longitudinal axis onto at least a portion of said circumferential surface to form an illuminated spot thereon, the characteristics of the laser rays reflected from the illuminated spot varying in dependence of the topography of said circumferential surface, scanning said part of said circumferential surface with the laser beam, the laser beam having a point of origin, measurable and reference distances being defined between said point of origin and said circumferential surface, reflecting the laser beam from said circumferential surface, focusing the reflected laser beam so as to obtain a focal image of the illuminated spot, said focal image having a substantially predetermined diameter and defining with the illuminated spot an optical axis, defocused spot regions existing on opposite sides of the focal image along the optical axis, measuring the light intensity within said predetermined diameter along said defocused spot regions and said focal image, the light intensity reaching a peak when said predetermined diameter coincides with said focal image, the peak corresponding to said reference distance being defined as a reference peak, the peaks corresponding to said measurable distances being defined as measured peaks, respectively, and measuring the time deviation between said reference peak and corresponding of said measured peaks, the distance from the origin of the laser beam to said circumferential surface being determinable solely as a function of said time deviation between said reference peak and corresponding of said measured peaks, and said reference distance, respectively, transforming the measured time deviations obtained into recordable electrical signals, and recording said electrical signals.

2. A method as defined in claim 1, wherein said impinging step includes focusing the laser beam onto said surface.

3. A method as defined in claim 1, wherein the article is elongated, and has a longitudinal axis, and further comprising the step of moving the article along the longitudinal axis, the laser beam subtending a predetermined angle with the longitudinal axis.

4. A method as defined in claim 1, wherein the scanning step is performed within a frequency range of approximately 1 to 10 Hertz.

5. A method as defined in claim 1, and further comprising additional impinging, measuring, and scanning steps relating to another part of said surface, and synchronizing all of said impinging, measuring and scanning steps with one another.

6. A method as defined in claim 5, wherein all of said impinging steps are performed so as to scan at least mutually adjacent regions of the surface being measured, and wherein said synchronizing step includes converting the electrical signals into a single signal representative of the entire topography of said surface.

7. A method as defined in claim 6 and further comprising the step of visually displaying said single signal.

8. A method as defined in claim 1, and further comprising the step of displaying the results of the measuring step in visual form.

9. A method as defined in claim 1, further comprising the step of continuously rotating said laser beam around said article.

10. A method as claimed in claim 1 further comprising the step of smoothing out said measured deviations prior to the transformation thereof to said electrical signals.

11. A method of manufacturing an elongated article, having a circumferential surface, the steps comprising:
continuously shaping said article,
advancing the article past a measuring location,
impinging at least one laser beam at an angle with the longitudinal axis of said article onto at least a portion of said circumferential surface of the measuring location to form an illuminated spot thereon, the characteristics of the laser rays reflected from the illuminated spot varying in dependence of the topography of said circumferential surface, scanning said part of said circumferential surface with the laser beam, the laser beam having a point of origin, measurable and reference distances being defined between said point of origin and said circumferential surface, reflecting the laser beam from said circumferential surface, focusing the reflected laser beam so as to obtain a focal image of the illuminated spot, said focal image having a substantially predetermined diameter and defining with the illuminated spot an optical axis, defocused spot regions existing on opposite sides of the focal image along the optical axis, measuring the light intensity within said predetermined diameter along said defocused spot regions and said focal image, the light intensity reaching a peak when said predetermined diameter coincides with said focal image, the peak corresponding to said reference distance being defined as the reference peak, the peaks corresponding to said measurable distances being defined as measured peaks, respectively, and measuring the time deviation between said reference peak and corresponding of said measured peaks, the distance from the origin of the laser beam to said circumferential surface being determinable solely as a function of said time deviation between said reference peak and corresponding of said measured peaks, and of said reference distance, respectively, and feeding back the results of the measuring step to the shaping step, so as to control the shaping step in dependence on the feedback results.

12. A laser-optical system for measuring the circumferential surface of an article moving continuously along a longitudinal axis thereof comprising, in combination:

means for directing at least one laser beam at an angle with said longitudinal axis onto the circumferential surface to be measured to form an illuminated spot thereon, the laser rays reflected from the illuminated spot varying in dependence on the topography of the circumferential surface;

means for scanning the laser beam across said circumferential surface, wherein said laser beam has a point of origin, a plurality of measurable distances, inclusive of a reference distance, being defined between said point of origin and said circumferential surface to be measured, means for measuring the characteristics of the laser rays reflected from the illuminated spot, including a light stop and moving means for periodically moving said light stop between two extreme positions in an additional light path, an intermediate point between said two extreme positions corresponding to said reference distance, the illuminated light spot being substantially focusable onto said light stop at a plurality of determinable distances from one of said extreme positions, so as to define peaks of light intensity occurring at measurable time deviations from respective predetermined time slots, each predetermined time slot corresponding to said reference distance, each measurable time deviation corresponding to a respective measurable incremental distance from said reference distance, the sum of respective incremental distances and of said reference distance corresponding to said measurable distances, whereby said measurable distances, and consequently, a contour of a cross-section of said article is obtainable from said measurable time deviations.

13. A system as defined in claim 12, wherein the means for directing the laser beam into the surface includes a laser from which the laser beam exits in one direction for travel in a predetermined path, and further comprising:
   a collimating lens and a collecting lens arranged in series in said path, and wherein said means from measuring said characteristics includes a one-way mirror extending across, and at an acute angle to said path, and being permeable to the laser beam traveling in said one direction, but at least partly reflecting any light rays traveling in said path opposite to said one direction into said additional path, and
   a light sensor arranged in said additional path.

14. A system as defined in claim 13, and wherein said means for measuring said characteristics further includes an additional collecting lens arranged in said additional path between said one-way mirror and said light sensor.

15. A system as defined in claim 13, further comprising voltage-controlled oscillator means postcoupled to said light sensor for smoothing said measurable time deviations so as to obtain a smooth contour of said cross-section of said article.

16. A system as defined in claim 12, further comprising smoothing means connected to said moving means for providing a substantially continuous signal corresponding to said determinable distances.

17. A system as defined in claim 16, wherein said moving means includes an oscillator, and wherein said smoothing means includes a lock-in detector having two inputs, and an output, one of said inputs being connected to said light sensor, the other to said oscillator, said output providing said substantially continuous signal.

18. A system as defined in claim 16, further comprising signal evaluating means including a measurement result decoder connected to said smoothing means, an electronic data processor connected to said decoder, and parameter-feeding, and indicating means connected to said data processor.

19. A system as defined in claim 12, wherein said means for directing one laser beam onto said surface, said means for measuring said characteristics, and said means for scanning the laser beam across said surface together form a laser-optical unit; and further comprising a ring-shaped support member, and wherein said laser-optical unit is mounted on said support member for being circumferentially adjusted thereon.

20. A system as defined in claim 19, further comprising at least one additional laser-optical unit, similar to said laser-optical unit, and also mounted on said support member, and circumferentially adjustable thereon.

21. A system as defined in claim 12, wherein said means for scanning the laser beam across the surface includes a refracting grating having a controllable index of refraction.

22. In a method of measuring and recording the circumferential surface of an article moving continuously along a longitudinal axis thereof, the steps comprising:
   impinging at least one laser beam at an angle with said longitudinal axis onto first and second positions of said circumferential surface to form illuminated spots thereon, the characteristics of the laser ray reflected from the illuminated spots varying in dependence of the topography of said circumferential surface,
   scanning said positions of said circumferential surface with the laser beam, the laser beam having a point of origin, measurable and reference distances being defined between said point of origin and said circumferential surface,
   reflecting the laser beam from said first and second positions of said circumferential surface,
   focusing the reflected laser beam so as to obtain focal images of the illuminated spots, each focal image having a substantially predetermined diameter and defining with each illuminated spot an optical axis, defocused spot regions existing on opposite sides of each focal image along the optical axis,
   measuring the light density within said predetermined diameter along corresponding of said defocused spot regions and said focal image, the light intensity reaching a peak when said predetermined diameter coincides with said focal image, the peak corresponding to said reference distance being defined as a reference peak, the peaks corresponding to said measurable distances being defined as measured peaks, respectively, and
   measuring the time deviation between said reference peak and corresponding of said measured peaks, the distance from the origin of the laser beam to said circumferential surface being determinable solely as a function of said time deviation between said reference peak and corresponding of said measured peaks, and said reference distance, respectively,
   transforming the measured time deviations into recordable electrical signals,
   recording said electrical signals, and
   synchronizing all of said impinging, measuring and scanning steps with one another.

* * * * *

UNITED STATES PATENT AND TRADEMARK OFFICE
CERTIFICATE OF CORRECTION

PATENT NO. : 4,264,208
DATED : April 28, 1981
INVENTOR(S) : Rainer Haberl et al.

It is certified that error appears in the above—identified patent and that said Letters Patent is hereby corrected as shown below:

On the title page, Item [63], "Oct. 25, 1978" should read

--- August 29, 1978 ---.

Column 1, lines 7 and 8 "Oct. 25, 1978" should read

--- August 29, 1978 ---.

Signed and Sealed this

First Day of September 1981

[SEAL]

Attest:

Attesting Officer

GERALD J. MOSSINGHOFF

Commissioner of Patents and Trademarks